United States Patent
Yang et al.

(10) Patent No.: US 12,491,768 B2
(45) Date of Patent: Dec. 9, 2025

(54) DUAL POWER CONTROLLER OF VEHICLE, VEHICLE SYSTEM INCLUDING THE SAME, AND METHOD THEREOF

(71) Applicants: HYUNDAI MOTOR COMPANY, Seoul (KR); Kia Corporation, Seoul (KR)

(72) Inventors: Hee Gun Yang, Anyang-si (KR); Sung Tae Kim, Yongin-si (KR); Jong Joo Kim, Suwon-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 523 days.

(21) Appl. No.: 17/506,955

(22) Filed: Oct. 21, 2021

(65) Prior Publication Data

US 2022/0363133 A1    Nov. 17, 2022

(30) Foreign Application Priority Data

May 10, 2021    (KR) ........................ 10-2021-0060241

(51) Int. Cl.
*B60L 1/00*  (2006.01)
*B60L 50/60*  (2019.01)
*B60L 58/13*  (2019.01)

(52) U.S. Cl.
CPC ................. *B60L 1/00* (2013.01); *B60L 50/60* (2019.02); *B60L 58/13* (2019.02)

(58) Field of Classification Search
None
See application file for complete search history.

(56) References Cited

U.S. PATENT DOCUMENTS

2011/0221394 A1*  9/2011  Shigemizu ............ H02J 7/0018
                                                               320/118
2018/0159342 A1*  6/2018  Chen ..................... H02J 7/0013

FOREIGN PATENT DOCUMENTS

KR    20100095247 A  *  8/2010

OTHER PUBLICATIONS

Park Young Han Translation (Year: 2010).*
Digital video recording device for vehicles (Year: 2009).*

* cited by examiner

*Primary Examiner* — James M Mcpherson
*Assistant Examiner* — Bakari Underwood
(74) *Attorney, Agent, or Firm* — MORGAN, LEWIS & BOCKIUS LLP (57) ABSTRACT

A vehicle system includes a first battery that supplies main power, when a vehicle is turned on, a second battery that supplies power in an auxiliary manner to an electric load of the vehicle and a video data recorder in the vehicle during parking, and a dual power controller that classifies a discharge region of the second battery as a first discharge interval or a second discharge interval, supplies power to the electric load and the video data recorder in the vehicle using the second battery in the first discharge interval, and supplies power to the video data recorder using the second battery in the second discharge interval.

15 Claims, 5 Drawing Sheets

| CLASSIFICATION | MAIN BATTERY | AUXILIARY BATTERY | NOTES |
|---|---|---|---|
| DISCHARGE INTERVAL A | ON | ON (LOAD DURING PARKING AND BUILT-IN CAM) | - |
| DISCHARGE INTERVAL B | ON | ON (Built-in Cam only) | SEPARATE POWER OF MAIN BATTERY AND AUXILIARY BATTERY |

| CLASSIFICATION | MAIN BATTERY | AUXILIARY BATTERY | NOTES |
|---|---|---|---|
| DISCHARGE INTERVAL A | ON | ON (LOAD DURING PARKING AND BUILT-IN CAM) | — |
| DISCHARGE INTERVAL B | ON | ON (Built-in Cam only) | SEPARATE POWER OF MAIN BATTERY AND AUXILIARY BATTERY |

DUAL POWER CONTROLLER OF VEHICLE, VEHICLE SYSTEM INCLUDING THE SAME, AND METHOD THEREOF

CROSS-REFERENCE TO RELATED APPLICATION

The present application claims priority to Korean Patent Application No. 10-2021-0060241, filed on May 10, 2021, the entire contents of which is incorporated herein for all purposes by this reference.

BACKGROUND OF THE INVENTION

Field of the Invention

The present invention relates to a dual power controller of a vehicle, a vehicle system including the same, and a method thereof, and more particularly, relates to technologies of controlling a dual power control of a vehicle during parking.

Description of Related Art

Recently, there has been a trend to mount a black box, a built-in cam, or the like of recording images when a vehicle is traveling or parks on the vehicle as a default option.

When performing long-time recording, the video data recorders consume a lot of the power of a main battery of the vehicle. As the main battery is discharged, the video data recorders cause that it is impossible for the vehicle to start.

Thus, when the voltage of the main battery deteriorates to a certain level or less, a discharge prevention circuit disconnects the main battery from the video data recorder to protect capacity of the main battery. However, in the instant case, a drive video record system is not operated.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a dual power controller of a vehicle for dividing and controlling a discharge region of an auxiliary battery to prevent a main battery from being discharged during parking and improve starting performance and maintaining a recording time during parking in a video data recorder in the vehicle, a vehicle system including the same, and a method thereof.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, a vehicle system may include a first battery that supplies main power, when a vehicle is turned on, a second battery that supplies power in an auxiliary manner to an electric load of the vehicle and a video data recorder in the vehicle during parking, and a dual power controller that classifies a discharge region of the second battery as a first discharge interval or a second discharge interval, supplies power to the electric load and the video data recorder in the vehicle using the second battery in the first discharge interval, and supplies power to the video data recorder using the second battery in the second discharge interval.

In various exemplary embodiments of the present invention, the dual power controller may separately set the first discharge interval and the second discharge interval by using required capacity of discharge of the video data recorder.

In various exemplary embodiments of the present invention, the dual power controller may set a boundary value between the first discharge interval and the second discharge interval by using power usage per hour in the video data recorder and a power usage time of the video data recorder.

In various exemplary embodiments of the present invention, the dual power controller may be configured to determine whether a state of charge (SOC) value of the second battery corresponds to the first discharge interval or the second discharge interval.

According to various aspects of the present invention, a dual power controller of a vehicle may include a processor that controls charging and discharging of a main battery and an auxiliary battery, classifies a discharge region of the auxiliary battery as a first discharge interval or a second discharge interval during parking, supplies power to an electric load and a video data recorder in a vehicle using the auxiliary battery in the first discharge interval, and supplies power to the video data recorder by using the auxiliary battery in the second discharge interval and a storage storing data and an algorithm run by the processor.

In various exemplary embodiments of the present invention, the processor may separately set the first discharge interval and the second discharge interval by using required capacity of discharge of the video data recorder.

In various exemplary embodiments of the present invention, the processor may set a boundary value between the first discharge interval and the second discharge interval by using power usage per hour in the video data recorder and a power usage time of the video data recorder.

In various exemplary embodiments of the present invention, the processor may determine whether a state of charge (SOC) value of the auxiliary battery corresponds to the first discharge interval or the second discharge interval.

According to various aspects of the present invention, a dual power control method of a vehicle may include classifying and presetting a discharge region of an auxiliary battery between a main battery and the auxiliary battery as a first discharge interval or a second discharge interval, supplying power to an electric load and a video data recorder in a vehicle using the auxiliary battery in the first discharge interval, and supplying power to the video data recorder by using the auxiliary battery in the second discharge interval.

In various exemplary embodiments of the present invention, the classifying as the first discharge interval or the second discharge interval may include separately setting the first discharge interval and the second discharge interval by using required capacity of discharge of the video data recorder.

In various exemplary embodiments of the present invention, the classifying as the first discharge interval or the second discharge interval may further include setting a boundary value between the first discharge interval and the second discharge interval by using power usage per hour in the video data recorder and a power usage time of the video data recorder.

In various exemplary embodiments of the present invention, the dual power control method may further include determining whether a state of charge (SOC) value of the auxiliary battery corresponds to the first discharge interval or the second discharge interval.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIG. 1, FIG. 2, FIG. 3, FIG. 4, and FIG. 5.

Figure 1:
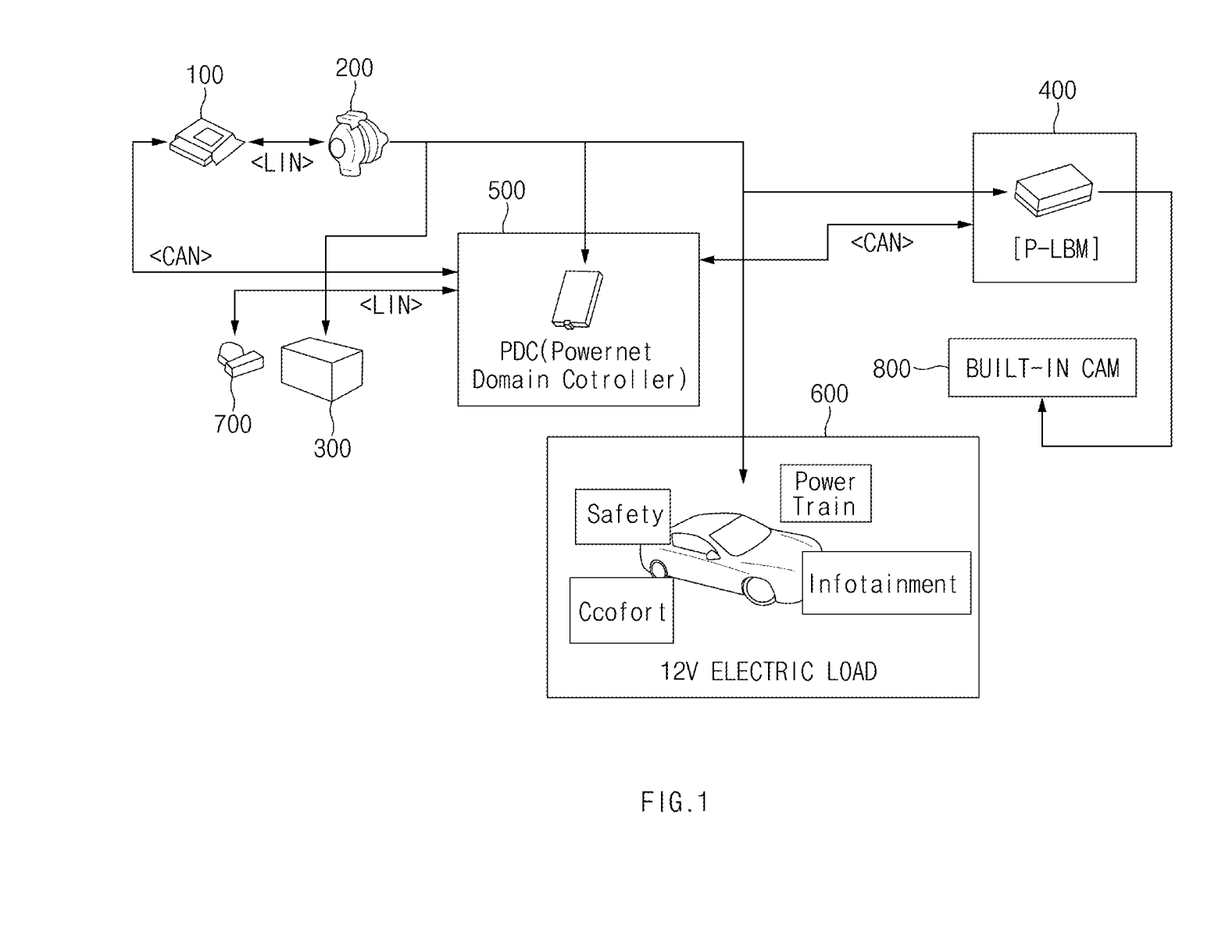
FIG. 1 is a block diagram illustrating a configuration of a vehicle system for performing dual power control of a vehicle according to various exemplary embodiments of the present invention.

FIG. 1 is a block diagram illustrating a configuration of a vehicle system including a dual power controller of a vehicle according to various exemplary embodiments of the present invention.

Referring to FIG. 1, the vehicle system according to various exemplary embodiments of the present invention may include a dual power controller 100 of a vehicle, an alternator 200, a first battery 300, a second battery 400, a powernet domain controller (PDC) 500, an electric load 600, an intelligent battery sensor (IBS) 700, and a built-in cam 800.

The dual power controller 100 of the vehicle according to various exemplary embodiments of the present invention may be implemented in the vehicle. In the instant case, the dual power controller 100 of the vehicle may be integrally configured with control units in the vehicle or may be implemented as a separate device to be connected to the control units of the vehicle by a separate connection means.

The dual power controller 100 of the vehicle may control charging and discharging of a main battery (or the first battery 300) and an auxiliary battery (or the second battery 400), which may classify a discharge region of the auxiliary battery as at least two discharge intervals including a first discharge interval and a second discharge interval during parking, may supply electric power to the electric load 600 and a video data recorder (e.g., the built-in cam 800) in the vehicle using the auxiliary battery, when the SOC value of the auxiliary battery corresponds to the first discharge interval, and may supply electric power to the video data recorder by using the auxiliary battery, when the SOC value of the auxiliary battery corresponds to the second discharge interval.

The alternator 200 may be an electric device which converts mechanical energy into electrical energy, which may generate alternating current (AC) electricity. Thus, the alternator 200 may charge the first battery 300 and the second battery 400 when the vehicle is traveling.

The first battery 300 may be the main battery (e.g., 12 V Pb), which may supply power when the vehicle is turned on and may supply power when the vehicle is traveling.

The second battery 400 may be a lithium auxiliary battery (e.g., P-LBM or NCM), which may supply electric power to the electric load 600 and the built-in cam 800 during parking.

The PDC 500 may be a powernet domain controller.

The electric load 600 may consume power while driving or parking.

The IBS 700 may sense states of the first battery 300 and the second battery 400 and may provide the dual power controller 100 of the vehicle with the sensed states.

The built-in cam 800 may be a video data recorder embedded in the vehicle, which may capture and store an image around the vehicle while the vehicle travels and parks.

As shown in FIG. 1, the dual power controller 100 of the vehicle may supply power to the 12V electric load 600 using the second battery 400 as well as the first batter 300 during parking, thus minimizing power consumption of the first battery 300 to prevent the first battery 300 from being discharged.

However, when the 12V electric load 600 corresponds to a discharge limit of the second battery 400, it becomes impossible to guarantee a recording time during parking in the built-in cam 800.

Thus, the dual power controller 100 of the vehicle may correspond to the electric load 600 using the second battery 400 during parking, which may divide and control the discharge interval of the second battery 400 into two intervals to ensure a recording time during parking the built-in cam 800. A description will be provided in detail below of such a discharge interval with reference to FIG. 3 and FIG. 4.

Figure 2:
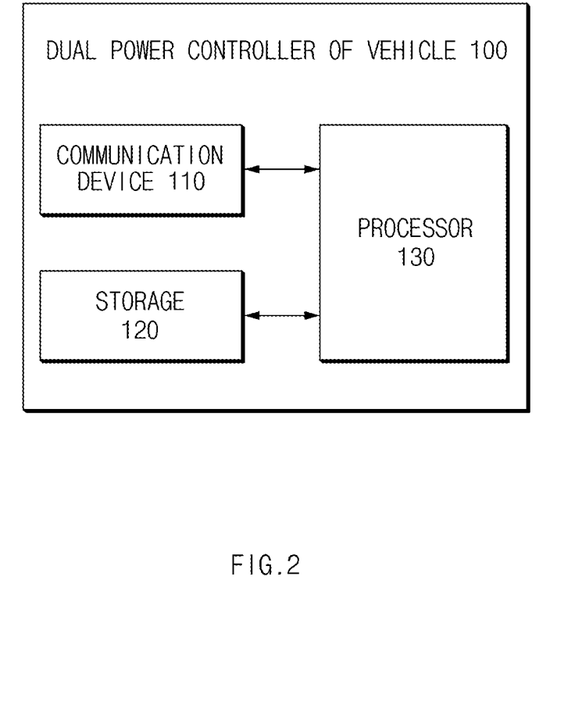
FIG. 2 is a block diagram illustrating a detailed configuration of a dual power controller of a vehicle according to various exemplary embodiments of the present invention.

FIG. 2 is a block diagram illustrating a detailed configuration of a dual power controller of a vehicle according to various exemplary embodiments of the present invention.

Referring to FIG. 2, a dual power controller 100 of a vehicle may include a communication device 110, a storage 120, and a processor 130.

The communication device 110 may be a hardware device implemented with various electronic circuits to transmit and receive a signal through a wireless or wired connection, which may transmit and receive information with devices in the vehicle based on a network communication technology in the vehicle. As an example, the network communication technology in the vehicle may include controller area network (CAN) communication, Local Interconnect Network (LIN) communication, flex-ray communication, or the like.

The storage 120 may store data, an algorithm, and/or the like necessary for an operation of the processor 130. As an example, the storage 120 may store setting values of a first discharge interval (discharge interval A) and a second discharge interval (discharge interval B) of a second battery 400 of FIG. 1.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected to the communication device 110, the storage 120, or the like and may electrically control the respective components. The processor 130 may be an electrical circuit which executes instructions of software and may perform a variety of data processing and calculation described below.

The processor 130 may process a signal delivered between the respective components of the dual power controller 100 of the vehicle and may perform the overall control such that the respective components may normally perform their own functions.

The processor 130 may be implemented in a form of hardware, may be implemented in a form of software, or may be implemented in a form of a combination thereof. The processor 130 may be implemented as a microprocessor and may be, for example, an electronic control unit (ECU), a micro controller unit (MCU), or another sub-controller, which is loaded into the vehicle.

The processor 130 may classify and preset the discharge region of the second battery 400 as a first discharge interval or a second discharge interval. The processor 130 may determine whether the SOC value of the second battery 400 belongs to the first discharge interval or the second discharge interval.

When the SOC value of the second battery 400 belongs to the first discharge interval, the processor 130 may supply electric power to an electric load 600 and a built-in cam 800 in the vehicle using the second battery 400. When the SOC value of the second battery 400 belongs to the second discharge interval, the processor 130 may supply power to the built-in cam 800 using the second battery 400.

The processor 130 may separately set the first discharge interval and the second discharge interval using required capacity of discharge of the built-in cam 800. Furthermore, the processor 130 may set a boundary value between the first discharge interval and the second discharge interval by using power usage per hour in the built-in cam 800 and a power usage time of the built-in cam 800.

Figure 3:
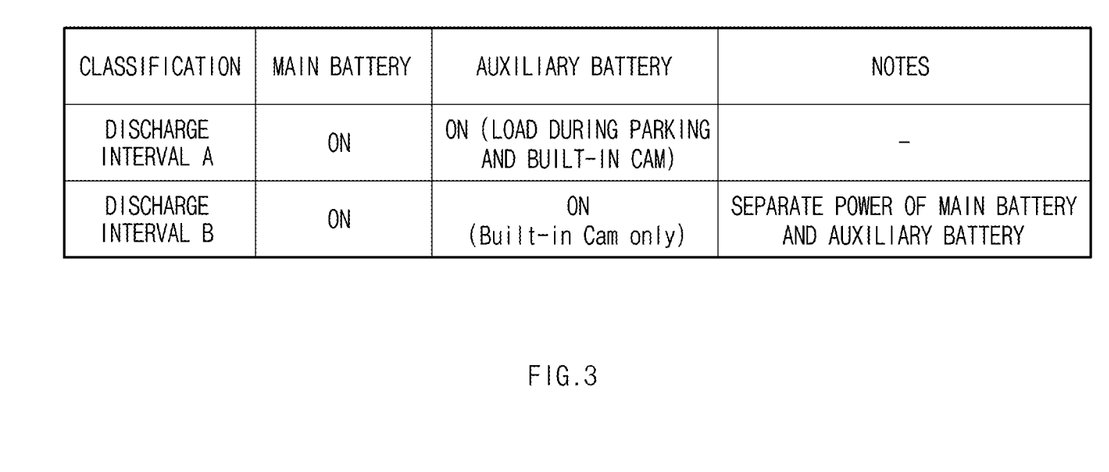
FIG. 3 is a drawing illustrating a control process for each discharge interval of a battery according to various exemplary embodiments of the present invention.

FIG. 3 is a drawing illustrating a control process for each discharge interval of a battery according to various exemplary embodiments of the present invention.

Referring to FIG. 3, a processor 130 of FIG. 2 may enable and use a main battery (or a first battery 300 of FIG. 1) and an auxiliary battery (or a second battery 400 of FIG. 1) in both of discharge interval A and discharge interval B.

Herein, the processor 130 may control such that the second battery 400 supplies power to an electric load 600 and a built-in cam 800 of FIG. 1 during parking in discharge interval A and such that the second battery 400 supplies power to only the built-in cam 800 during parking in discharge interval B. In the instant case, the electric load 600 may receive power by the first battery 300.

Figure 4:
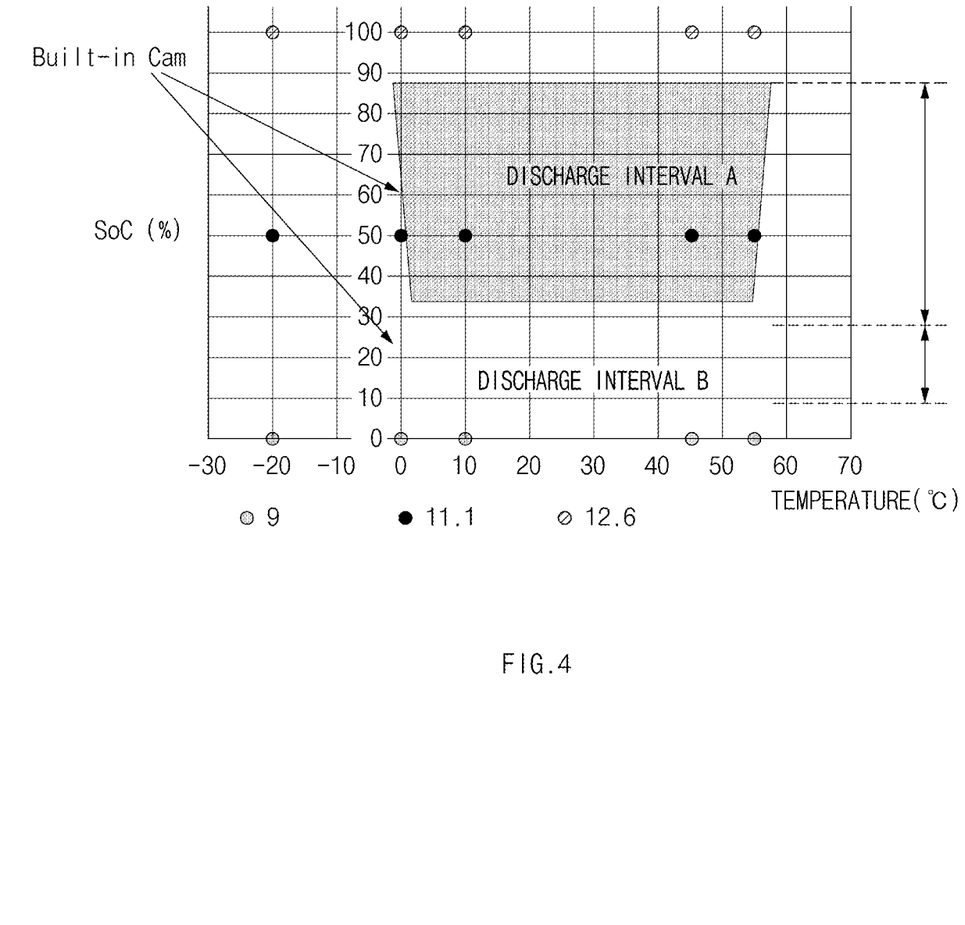
FIG. 4 is a drawing illustrating a method for defining a discharge interval according to a battery temperature and a state of charge (SOC) according to various exemplary embodiments of the present invention.

FIG. 4 is a drawing illustrating a method for defining a discharge interval according to a battery temperature and an SOC according to various exemplary embodiments of the present invention.

Referring to FIG. 4, a processor 130 of FIG. 2 may set discharge interval A and discharge interval B depending on required capacity of discharge of a built-in cam 800. In the instant case, the processor 130 may select an available SOC region with regard to a cell characteristic of a second battery 400 of FIG. 2 and may determine and set SOC operating regions of discharge interval A and discharge interval B.

First of all, the processor 130 may determine an upper limit value of the SOC in discharge interval A with regard to a cell characteristic of the second battery 400 and may set the upper limit value of the SOC to 90% of all values. Furthermore, the processor 130 may set a lower limit value of discharge interval A to be same as the upper limit value of discharge interval B. Furthermore, the processor 130 may set a lower limit value of discharge interval B to 10% of all values.

For example, when the power usage per hour in the built-in cam 800 is 0.5 A and when the power usage time of the built-in cam 800 is 12 hours, required capacity of discharge is 0.5*12 to be 6 Ah.

When the total amount of discharge of the second battery 400 is 30 Ah, an available SOC value of the second battery 400 for the built-in cam 800 is like Equation 1 below.

$$\text{Available } SOC(\%) = \frac{\text{Required amount of discharge of built-in cam}}{\text{Total amount of discharge of second battery}} * 100 \quad \text{[Equation 1]}$$

Thus, the available SOC may be (6 Ah/30 Ah)*100 to be 20%.

Thus, the processor 130 may determine that an available region is 10% to 30% based on an available SOC (20%) of discharge interval B of the built-in cam 800 and may add an error range of 5% to the available region to set the lower limit value of discharge interval A and the upper limit value of discharge interval B, that is, a boundary value between discharge interval A and discharge interval B to 35%. Thus, the processor 130 may set an available region of discharge interval A to 35% to 90%.

A boundary range between discharge interval A and discharge interval B may preset using required capacity of discharge of the built-in cam 800 and total capacity of the second battery 400. The above-mentioned numeral values are not limited thereto, which may be varied.

Accordingly, of the present invention an exemplary embodiment of the present invention may use both the first battery 300 and the second battery 400 to supply electric power to the electric load 600 and the built-in cam 800 during parking, which may divide and control a discharge interval depending on an SOC value of the second battery 400 to reduce power consumption of the first battery 300 using the electric load 600 and the built-in cam 800 during parking and may prevent the first battery 300 from being discharged to reduce impossibility of starting and ensure a recording time during parking in the built-in cam 800, thus increasing satisfaction of marketability.

Figure 5:
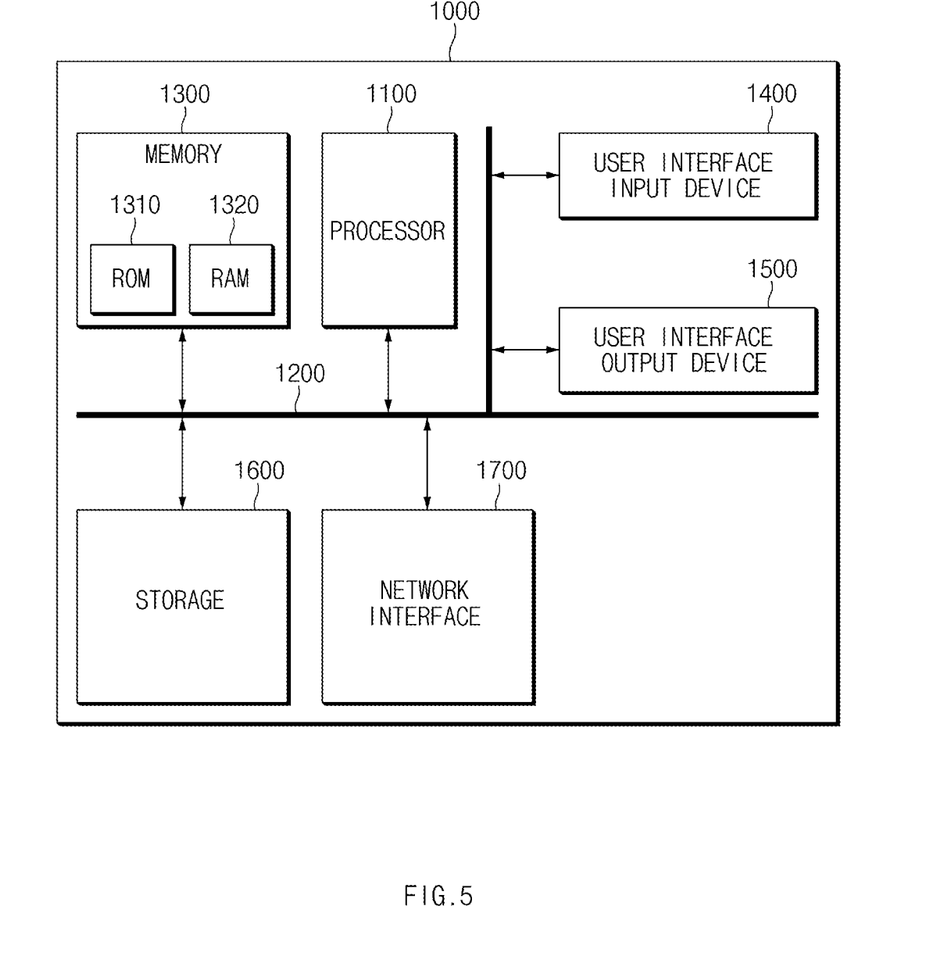
FIG. 5 is a block diagram illustrating a computing system according to various exemplary embodiments of the present invention.

FIG. 5 is a block diagram illustrating a computing system according to various exemplary embodiments of the present invention.

Referring to FIG. 5, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may divide and control a discharge region of the auxiliary battery to prevent the main battery from being discharged during parking and improve starting performance and may maintain a recording time during parking in the video data recorder in the vehicle to increase convenience of the user.

Furthermore, various effects ascertained directly or indirectly through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle system comprising:
   a first battery configured to supply main power when a vehicle is turned on;
   a second battery configured to supply auxiliary power to an electric load of the vehicle and a video data recorder in the vehicle during parking of the vehicle; and
   a dual power controller configured to classify a discharge region of the second battery as at least two discharge intervals including a first discharge interval and a second discharge interval, to supply electric power to the electric load and the video data recorder in the vehicle using the second battery in the first discharge interval, and to supply electric power to the video data recorder using the second battery in the second discharge interval,
   wherein the dual power controller is configured to:
      calculate required capacity of discharge of the video data recorder using power usage per hour in the video data recorder and a power usage time of the video data recorder;
      calculate an available State Of Charge (SOC) value of the second battery using a total amount of discharge of the second battery and the required capacity of discharge of the video data recorder; and set a boundary value between the first discharge interval and the second discharge interval using the available SOC value of the second battery.

2. The vehicle system of claim 1, wherein the dual power controller is configured to separately set the first discharge interval and the second discharge interval by using the required capacity of discharge of the video data recorder.

3. The vehicle system of claim 2, wherein the dual power controller is configured to select an available state of charge (SOC) region with regard to a cell characteristic of the second battery to determine SOC operating regions of the first discharge interval and the second discharge interval.

4. The vehicle system of claim 3, wherein the dual power controller is configured to determine an upper limit value of the SOC operating region in the first discharge interval by setting a first predetermined percentage of all values of the SOC operating region as the upper limit value, to set a lower limit value of the first discharge interval to be same as an upper limit value of the second discharge interval, and to set a second predetermined percentage of the all values of the SOC operating region as a lower limit value of the second discharge interval, wherein the first predetermined percentage is higher than the second predetermined percentage.

5. The vehicle system of claim 1, wherein the dual power controller is configured to determine whether a state of charge (SOC) value of the second battery corresponds to the first discharge interval or the second discharge interval.

6. A dual power controller of a vehicle, the dual power controller comprising:
a processor configured to control charging and discharging of a main battery and an auxiliary battery, to classify a discharge region of the auxiliary battery as at least two discharge intervals including a first discharge interval and a second discharge interval during parking, to supply electric power to an electric load and a video data recorder in the vehicle using the auxiliary battery in the first discharge interval, and to supply electric power to the video data recorder by using the auxiliary battery in the second discharge interval; and
a storage storing data and an algorithm run by the processor,
wherein the processor is configured to:
calculate required capacity of discharge of the video data recorder using power usage per hour in the video data recorder and a power usage time of the video data recorder;
calculate an available State Of Charge (SOC) value of the second battery using a total amount of discharge of the second battery and the required capacity of discharge of the video data recorder; and
set a boundary value between the first discharge interval and the second discharge interval using the available SOC value of the second battery.

7. The dual power controller of claim 6, wherein the processor is configured to separately set the first discharge interval and the second discharge interval by using the required capacity of discharge of the video data recorder.

8. The dual power controller of claim 7, wherein the dual power controller is configured to select an available state of charge (SOC) region with regard to a cell characteristic of the second battery to determine SOC operating regions of the first discharge interval and the second discharge interval.

9. The dual power controller of claim 8, wherein the dual power controller is configured to determine an upper limit value of the SOC operating region in the first discharge interval by setting a first predetermined percentage of all values of the SOC operating region as the upper limit value, to set a lower limit value of the first discharge interval to be same as an upper limit value of the second discharge interval, and to set a second predetermined percentage of the all values of the SOC operating region as a lower limit value of the second discharge interval, wherein the first predetermined percentage is higher than the second predetermined percentage.

10. The dual power controller of claim 6, wherein the processor is configured to determine whether a state of charge (SOC) value of the auxiliary battery corresponds to the first discharge interval or the second discharge interval.

11. A dual power control method of a vehicle, the dual power control method comprising:
classifying and presetting, by a dual power controller, a discharge region of an auxiliary battery between a main battery and the auxiliary battery as at least two discharge intervals including a first discharge interval and a second discharge interval;
supplying, by the dual power controller, electric power to an electric load and a video data recorder in the vehicle by using the auxiliary battery in the first discharge interval; and
supplying, by the dual power controller, electric power to the video data recorder by using the auxiliary battery in the second discharge interval,
wherein the classifying as the first discharge interval or the second discharge interval further includes:
calculating required capacity of discharge of the video data recorder using power usage per hour in the video data recorder and a power usage time of the video data recorder;
calculating an available State Of Charge (SOC) value of the second battery using a total amount of discharge of the second battery and the required capacity of discharge of the video data recorder; and
setting a boundary value between the first discharge interval and the second discharge interval using the available SOC value of the second battery.

12. The dual power control method of claim 11, wherein the classifying as the first discharge interval or the second discharge interval includes:
separately setting the first discharge interval and the second discharge interval by using the required capacity of discharge of the video data recorder.

13. The dual power control method of claim 12, further including:
selecting, by the dual power controller, an available state of charge (SOC) region with regard to a cell characteristic of the second battery to determine SOC operating regions of the first discharge interval and the second discharge interval.

14. The dual power control method of claim 13, further including:
determining, by the dual power controller, an upper limit value of the SOC operating region in the first discharge interval by setting a first predetermined percentage of all values of the SOC operating region as the upper limit value, setting a lower limit value of the first discharge interval to be same as an upper limit value of the second discharge interval, and setting a second predetermined percentage of the all values of the SOC operating region as a lower limit value of the second discharge interval.

15. The dual power control method of claim 11, further including:

determining whether a state of charge (SOC) value of the auxiliary battery corresponds to the first discharge interval or the second discharge interval.

\* \* \* \* \*